Patented Nov. 16, 1948

2,454,260

UNITED STATES PATENT OFFICE 2,454,260

PREPARATION OF METAL MERCAPTIDES OF AMINO-ARYL MERCAPTANS

Norbert Steiger, Nutley, N. J., assignor to Hoffmann-La Roche Inc., Nutley, N. J., a corporation of New Jersey No Drawing. Application February 12, 1946, Serial No. 647,197

9 Claims. (Cl. 260—429)

This invention relates to the manufacture of zinc mercaptides of amino-aryl mercaptans. My invention has for an object the synthesis of zinc mercaptides by a process which yields compounds of high purity, valuable for a number of purposes, such as fungicides and dyestuff intermediates.

It is known that 2-mercapto-benzothiazole can be hydrolyzed by the use of a solution of sodium hydroxide. See, for example, United States patent to Lubs and Cole, No. 1,954,706. In this respect, note may also be taken of English Patent No. 355,808.

According to my invention, the hydrolysis can be carried out as typified by the characteristic equation:

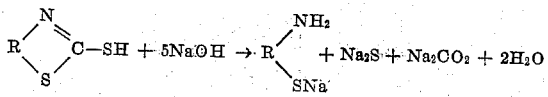

wherein R is an aryl nucleus, adjacent carbon atoms of which are attached to the nitrogen and sulfur atoms. I may, for example, use a benzene or naphthalene nucleus, which may be unsubstituted, or which may be substituted, e. g., by alkoxy, alkyl, or the like.

The final products may be represented as follows:

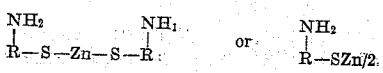

in which R is an aryl nucleus, the carbon attached to the amino group being in ortho position to the carbon attached to the sulfur.

I have found that the hydrolysis shown above can be carried out by means of alkali metal hydrolyzing agents, in the presence of calcium hydroxide, whereby the alkali metal carbonate is removed by the formation of insoluble calcium carbonate. For example, if sodium hydroxide is employed as the hydrolyzing agent, the sodium carbonate is converted into insoluble calcium carbonate.

Thereafter, the sodium sulphide is eliminated by precipitation with just sufficient zinc chloride to react with all the sodium sulphide. This treatment with zinc chloride is carried out in the presence of, e. g., the hydrolyzing agent such as sodium hydroxide. The treatment results in the precipitation of zinc sulphide. However, the quantity of zinc chloride is such that no appreciable amount of zinc mercaptide of the aryl mercaptan is formed. In other words, the sodium sulphide is selectively reacted with zinc chloride. The amount of zinc chloride to be employed can be determined by a simple spot test with lead acetate.

After this treatment, the hydrolysate contains the sodium salts of the amino-aryl mercaptan in solution, as well as calcium carbonate and zinc sulphide as precipitated solids. After filtration to remove the calcium carbonate and zinc sulphide, the filtrate contains only the sodium salt of the amino mercaptan and sodium hydroxide. If so desired, the calcium carbonate can be separated before the zinc chloride is added, in which case two filtrations are employed, one to remove calcium carbonate, and the other to remove zinc sulphide.

The filtrate, which is free of calcium carbonate and zinc sulphide, is then reacted with additional zinc chloride, for example by running the solution into a solution of zinc chloride in water and acetic acid, whereby the zinc mercaptide of the amino-aryl mercaptan is obtained uncontaminated by inorganic zinc compounds. The acetic acid apparently functions to solubilize zinc hydroxide, which is formed by the reaction of zinc chloride and the base, for example, sodium hydroxide.

A variety of aryl mercaptans may be employed to effect the formation of zinc mercaptides. By way of illustrating my process, the following examples are given. It will be understood, however, that the reactants, quantities thereof, as well as procedural details, are merely illustrative. Other and obvious modifications will be apparent to those skilled in the art.

EXAMPLE 1

*Zinc mercaptide of 2-amino-benzenethiol*

A stainless steel autoclave with agitator is charged with 120 g. slaked lime (made up from 70 g. quick lime), 200 g. NaOH flakes, 167 g. 2-mercaptobenzothiazole and 320 cc. water and heated for 12 hours at a temperature of 185°. The content is diluted with water to 2000 cc. and is heated in a beaker under good agitation to 70°. Then there is added slowly under the surface a solution of 165 g. ZnCl₂ in 500 cc. water; and the mass is heated half an hour at 80° to 90° C. A spot test on filter paper is supposed to give then a bright lemon yellow characteristic of sodium mercaptide with a drop of lead acetate solution. But if the spot test shows a brown color, indicative of incomplete removal of sodium sulphide, more ZnCl₂ (5 to 10 g.) has to be added, to convert all Na₂S into ZnS. The mass is then filtered from ZnS and CaCO₃, and the filtrate which contains the pure sodium mercaptide is then run into a solution of 80 g. ZnCl₂ in 1000 cc. water at 70° with simultaneous addition of 150 cc. glacial acetic acid. The acetic acid is for the purpose of solubilizing inorganic zinc hydroxide, which is formed by the action of zinc chloride on sodium hydroxide. The zinc-mercaptide of white color precipitates, is filtered and washed well with hot water. It is dried in vacuo at 70°.

Example 2

*Zinc derivatives of 2-amino-3-mercapto-diphenyl*

A stainless steel pressure vessel with agitator is charged with 150 grams slaked lime (made up from 90 grams quick lime), 310 grams of 2-mercapto-4-phenyl-benzothiazole, 300 grams NaOH (flakes) and 300 cc. water, and stirred 9 hours at 190–195°. The cold melt is diluted with water to 3 liters volume and there is added a solution of 174 g. zinc chloride in 500 cc. water. The mass is heated at 80° with stirring for one hour. 20 g. more zinc chloride as a solution are added and the mass stirred about one hour at 80° until brownish stain on lead acetate test paper changes to yellow. Filter cel is added and the mass is filtered, washing once with hot water. The filtrate is run into a solution of 150 g. zinc chloride in 700 cc. water, adding 50% acetic acid to remove alkalinity as the mercaptan solution is run in. The zinc mercaptide is filtered, washed well with hot water, and dried.

Example 3

*Zinc mercaptide of 1-amino-2-mercapto-naphthalene*

176 g. of 2-mercapto-naphthothiazole, 100 g. slaked lime (made up from 55 g. quick lime), and 375 cc. 40% caustic solution are heated in a pressure vessel for 12 hours at 190–195°. The melt is then worked up as described in Example 2. The obtained zinc mercaptide is of white color, insoluble in water and organic solvents.

Example 4

*Zinc mercaptide of 4-amino-3-mercapto-toluene*

143 g. 6-methyl-2-mercapto-benzothiazole, 100 g. slaked lime (made up from 60 g. quick lime), 400 cc. 36% caustic solution (by volume) are heated under stirring in an autoclave at 185–190° for 10 to 12 hours. The melt is then removed from the autoclave and diluted to 2500 cc. with water, 125 g. ZnCl₂ are added as about a 25% solution, heated to 90° and stirred for 45 minutes. When a spot test on lead acetate shows a bright yellow, the solution is filtered and washed with about 250 cc. hot water. The filtrate is poured into a solution of 115 g. ZnCl₂ in 500 cc. water and 80 cc. glacial acetic acid, maintaining litmus acidity throughout the addition. The zinc mercaptide is filtered, washed with hot water, and dried at 60–70° in vacuo. There are obtained 130 g. of the zinc mercaptide, which is of white color.

Example 5

*Zinc mercaptide of 3-amino-4-mercapto-toluene*

286 grams 5-methyl-2-mercapto-benzothiazole, 180 grams slaked lime (made up from 112 grams quick lime), 750 cc. 40% caustic solution (by volume) are put in an autoclave and stirred 10 hours at 185° C. The melt is then removed from autoclave and diluted to six liters with water. 240 grams zinc chloride are added, as a 25% solution. The mass is heated to 80° and stirred for one hour. A spot test on lead acetate shows then a bright yellow. Filter cel is added and the mass is filtered, washing once with hot water. The filtrate is run into a solution of 220 grams zinc chloride in 500 cc. water and 150 cc. glacial acetic acid, maintaining litmus acidity throughout the addition. The zinc mercaptide is filtered, washed with hot water on the funnel, and dried at 70° in vacuo.

In a similar way, I can prepare the zinc mercaptides of 2-amino-3-mercapto-toluene and of 4-amino-3-mercapto-toluene.

Example 6

*Zinc mercaptide of 4-amino-3-mercapto-1-ethoxybenzene*

158 g. 6-ethoxy-2-mercapto-benzothiazole, 100 g. slaked lime (made up from 60 g. quick lime), and 400 cc. 36% caustic solution, are heated in an autoclave at 180° for 12 hours. The melt is worked up as described in Example 4. There are obtained about 125 g. of the zinc mercaptide, which is of white color. The purity is about 93%.

Example 7

*Zinc mercaptide of 1,4-diamino-2,5-dimercapto-benzene*

An autoclave with agitator is charged with 120 grams slaked lime (made up from 70 grams of quick lime), 200 grams NaOH flakes, 128 grams dimercapto-benzothiazole, and 350 cc. water and heated for 10–12 hours at 185–190°. The content is then worked up the same way as described in Example 1. There is obtained in good yield and purity the zinc mercaptide of 1,4-diamino-2,5-dimercaptobenzene.

The starting material has the formula:

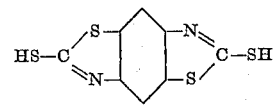

I claim:

1. A process of preparing zinc mercaptides of amino-aryl mercaptans which comprises hydrolyzing a compound of the general formula:

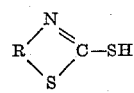

in which R is an arylene radical of the group consisting of the phenylene and naphthalene series, free from substituents reactive in the process steps, adjacent carbon atoms of which are attached to the nitrogen and sulfur atoms, with an alkali metal hydroxide in the presence of calcium hydroxide, whereby insoluble calcium carbonate is formed, treating the reaction product, in the presence of an alkali metal hydroxide, with zinc chloride of an amount sufficient substantially to remove sulphide in the form of insoluble zinc sulphide, but insufficient in amount to form any substantial quantity of zinc aryl-amino mercaptide, separating the insoluble calcium carbonate and zinc sulphide from the mixture, the calcium carbonate being separated at any stage prior to the next-mentioned step, and precipitating zinc mercaptide of the amino-aryl mercaptan by treating the solution with additional zinc chloride.

2. The process of claim 1 in which the formation of the zinc mercaptide by treatment with additional zinc chloride, is carried out in the presence of acetic acid.

3. The process of claim 1 in which the calcium carbonate is removed prior to the formation of zinc sulphide.

4. The process of claim 1 in which the insoluble calcium carbonate is removed with the insoluble zinc sulphide.

5. The process of claim 1 in which 2-mercapto-4-phenyl-benzothiazole is hydrolyzed.

6. The process of claim 1 in which 2-mercapto-benzothiazole is hydrolyzed.

7. The process of claim 1 in which 5-methyl-2-mercapto-benzothiazole is hydrolyzed.

8. A process of preparing metal compounds of amino-aryl mercaptans which comprises hydrolyzing a compound of the general formula:

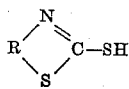

in which R is an arylene radical of the group consisting of the phenylene and naphthalene series, free from substituents reactive in the process steps, adjacent carbon atoms of which are attached to the nitrogen and sulfur atoms, with an alkali metal hydroxide in the presence of calcium hydroxide, whereby insoluble calcium carbonate is formed, treating the reaction product, in the presence of an alkali metal hydroxide, with zinc chloride in an amount sufficient substantially to remove sulphide in the form of insoluble zinc sulphide, but insufficient in amount to form any substantial quantity of zinc aryl-amino-mercaptide.

9. A process as in claim 8 which includes the step of separating the insoluble calcium carbonate and zinc sulphide from the mixture, the calcium carbonate being separated at any stage after its formation.

NORBERT STEIGER.

REFERENCES CITED

The following references are of record in the file of this patent:

UNITED STATES PATENTS

| Number | Name | Date |
|---|---|---|
| 1,633,626 | Feldt | June 28, 1927 |
| 2,007,335 | Lubs et al. | July 9, 1935 |
| 2,130,242 | Messer | Sept. 13, 1938 |
| 2,412,922 | Steiger | Dec. 17, 1946 |

FOREIGN PATENTS

| Number | Country | Date |
|---|---|---|
| 306,590 | Great Britain | Feb. 25, 1929 |
| 355,808 | Great Britain | Aug. 31, 1931 |
| 391,747 | Great Britain | Not accepted |
| 426,345 | Germany | Mar. 6, 1926 |
| 465,291 | Great Britain | May 5, 1937 |
| 492,886 | Germany | Mar. 3, 1930 |
| 657,183 | France | May 17, 1929 |

OTHER REFERENCES

Leaper, Jour. Amer. Chem. Soc., volume 53 (1931), page 1894.

Bogert et al., Jour. Amer. Chem. Soc., volume 57 (1935), page 1529.